(12) United States Patent
Sojic et al.

(10) Patent No.: US 11,953,322 B2
(45) Date of Patent: Apr. 9, 2024

(54) METHOD FOR CHECKING AND/OR CALIBRATING A HORIZONTAL AXIS OF A ROTATING LASER

(71) Applicant: Hilti Aktiengesellschaft, Schaan (LI)

(72) Inventors: Ivan Sojic, Buchs (CH); Monica Arzani, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 402 days.

(21) Appl. No.: 17/419,631

(22) PCT Filed: Dec. 17, 2019

(86) PCT No.: PCT/EP2019/085624
§ 371 (c)(1),
(2) Date: Jun. 29, 2021

(87) PCT Pub. No.: WO2020/141069
PCT Pub. Date: Jul. 9, 2020

(65) Prior Publication Data
US 2022/0082383 A1 Mar. 17, 2022

(30) Foreign Application Priority Data
Dec. 31, 2018 (EP) .................... 18216013

(51) Int. Cl.
*G01C 15/00* (2006.01)
*G01C 25/00* (2006.01)

(52) U.S. Cl.
CPC .......... *G01C 15/006* (2013.01); *G01C 25/00* (2013.01)

(58) Field of Classification Search
None
See application file for complete search history.

(56) References Cited

U.S. PATENT DOCUMENTS

| | | | |
|---|---|---|---|
| 8,857,068 B2 * | 10/2014 | Kodaira | G01C 15/008 33/290 |
| 9,200,900 B2 | 12/2015 | Fessler et al. | |
| 10,684,129 B2 | 6/2020 | Lukic et al. | |
| 10,697,796 B2 * | 6/2020 | Lukic | G01C 25/00 |
| 10,823,565 B2 | 11/2020 | Winter et al. | |
| 10,895,472 B2 * | 1/2021 | Lukic | G01C 25/00 |

(Continued)

FOREIGN PATENT DOCUMENTS

| | | |
|---|---|---|
| EP | 2 781 880 A1 | 9/2014 |
| EP | 3 236 204 A2 | 10/2017 |

(Continued)

OTHER PUBLICATIONS

PCT/EP2019/085624, International Search Report dated Apr. 22, 2020 (Two (2) pages).

*Primary Examiner* — Yaritza Guadalupe-McCall
(74) *Attorney, Agent, or Firm* — Crowell & Moring LLP (57) ABSTRACT

A method for checking and/or calibrating a horizontal axis of a rotating laser using a laser receiver and a controller device which is communicatively connected to the rotating laser and the laser receiver where the rotating laser emits a laser beam rotating about an axis of rotation in a laser plane. An inclination angle is ascertained using a first fitting function and a second fitting function where the inclination angle is used for the checking and/or the calibrating of the horizontal axis.

6 Claims, 7 Drawing Sheets

(56) References Cited

U.S. PATENT DOCUMENTS

| | | | |
|---|---|---|---|
| 11,703,357 B2* | 7/2023 | Wang | G01C 15/006 33/29 |
| 2019/0154444 A1* | 5/2019 | Lukic | G01C 15/006 |
| 2022/0082383 A1* | 3/2022 | Sojic | G01C 25/00 |

FOREIGN PATENT DOCUMENTS

| WO | WO 2017/093085 A1 | 6/2017 |
|---|---|---|
| WO | WO 2017/093089 A1 | 6/2017 |

* cited by examiner

METHOD FOR CHECKING AND/OR CALIBRATING A HORIZONTAL AXIS OF A ROTATING LASER

BACKGROUND AND SUMMARY OF THE INVENTION

The present invention relates to a method for checking and/or for calibrating a horizontal axis of a rotating laser.

Rotating lasers are used indoors and outdoors for leveling and marking tasks, such as the display of horizontal, vertical or oblique laser marks on a target surface or the ascertainment and checking of horizontal height profiles, perpendicular lines, orientation lines and plumb points. Rotating lasers can be arranged in different device positions, which are embodied in the form of horizontal position and vertical position. Here, a distinction is made between horizontally usable rotating lasers, which are used only in the horizontal position, and horizontally and vertically usable rotating lasers, which are used in the horizontal position and vertical position. Horizontally usable rotating lasers have, as the device axes, a first horizontal axis and a second horizontal axis, which are perpendicular with respect to one another and define a horizontal plane. In addition to the first and the second horizontal axis, horizontally and vertically usable rotating lasers also have as the device axis a vertical axis which is perpendicular to the horizontal plane of the first and the second horizontal axis.

To ensure the accuracy of a rotating laser during operation, the accuracy must be checked regularly and, if a maximum difference defined by the device manufacturer is exceeded, the rotating laser must be calibrated. The accuracy of the rotating laser is checked separately here for each device axis. Methods for checking and/or calibrating a horizontal axis and methods for checking and/or calibrating a vertical axis are known. In the case of horizontally usable rotating lasers, the first and the second horizontal axis are checked in succession, wherein the order is arbitrary. In the case of horizontally and vertically usable rotating lasers, the vertical axis is checked after the first and the second horizontal axis have been checked.

The device axes are oriented in a defined state using a leveling device of the rotating laser. The defined state of the rotating laser in the horizontal position is referred to as the horizontal state and the one in the vertical position is referred to as the vertical state. The leveling device comprises a first leveling unit, which orients the first horizontal axis into a first defined state, a second leveling unit, which orients the second horizontal axis into a second defined state, and, in the case of a vertically usable rotating laser, a third leveling unit, which orients the vertical axis into a third defined state. The leveling units each comprise an inclination sensor measuring the inclination of the device axis and an adjustment element, with which the inclination of the device axis is adjustable. In the ideal case, the inclination sensors are oriented parallel to the assigned device axes. If an inclination sensor is not oriented parallel to the assigned device axis, the device axis has an inclination error.

The device manufacturers of rotating lasers in the operating instructions of their rotating lasers define methods for checking the horizontal axes that should be performed regularly by the operator and methods for calibrating the horizontal axes that should be performed by the operator if the defined maximum difference for the horizontal axes has been exceeded. The known methods for checking the horizontal axes are based on the principle of a reversal measurement. The rotating lasers are placed, in a horizontal position, on a stable underground or a tripod at a measurement distance from a measurement face and the horizontal axes of the rotating laser are oriented in a horizontal state. Every device manufacturer defines the measurement distance between the rotating laser and the measurement face and stipulates a maximum difference for the horizontal axes.

In the known methods for checking the horizontal axes, the rotating laser is arranged in a first angular position, in which the horizontal axis to be checked is oriented toward the measurement face, and the position of incidence of the laser beam on the measurement face is marked as a first control point. The rotating laser is rotated through 180° about the axis of rotation into a second angular position, in which the horizontal axis to be checked is oriented toward the measurement face in the opposite axial direction of the first angular position, and the position of incidence of the laser beam on the measurement face is marked as a second control point. The distance between the first and second control points on the measurement face is determined to be the difference and compared to the maximum difference for the horizontal axes stipulated by the device manufacturer. If the difference is greater than the maximum difference, it is necessary to calibrate the horizontal axis that was checked or to calibrate all device axes of the rotating laser.

The known methods for calibrating a horizontal axis are performed after the horizontal axes have been checked if the difference between the first and the second control point on the measurement face is greater than the maximum difference. If the position and orientation of the rotating laser have not been changed, the calibration of the horizontal axis can be performed using the first and second control points on the measurement face. The rotating laser is adjusted using the leveling device until the laser plane is situated at the center between the first and second control points. This position of the laser plane is stored as the new zero position for the horizontal axis. If the position and/or the orientation of the rotating laser have been changed, the method steps for checking the horizontal axis must be repeated and the positions of incidence of the laser beam on the measurement face must be marked as the new control points.

The known methods for checking and/or calibrating a horizontal axis of a rotating laser have the disadvantage that the positions of incidence of the laser beam are transferred to the measurement face manually by the operator and are unsuitable for automated implementation. In addition, the accuracy of the method is dependent on the care taken by the operator when determining the centerpoint of the laser beam, when transferring the centerpoint onto the measurement face, and when determining the distance between the control points. An additional disadvantage is that the measurement distance between the rotating laser and the measurement face when carrying out the methods is predefined.

EP 2 781 880 A1 discloses a method for checking a horizontal plane of a rotating laser and a method for calibrating the horizontal plane of the rotating laser. The horizontal plane of the rotating laser is checked in any desired three or more than three angular positions. For the angular positions of the rotating laser, any desired orientations can be chosen. The chosen angular positions are also determined during the respective method steps on the basis of a direction determination function. In the method for checking the horizontal plane, the rotating laser is arranged into the at least three angular positions manually by the operator or automatically using a motorized rotating platform, and the respective position of incidence of the leveled laser beam onto a detection field of a laser receiver is stored. EP 2 781 880 A1 provides no indication whatsoever as to how the horizontal plane of the rotating laser is calibrated. It merely states that, if the requirements have not been met or have not been met satisfactorily, the calibration data stored for the beam leveling function are updated automatically by the control and evaluation device.

It is the object of the present invention to develop a method for checking and/or calibrating a horizontal axis of a rotating laser that is independent of the distance of the rotating laser from a laser receiver. In addition, the method should be suitable for a largely automated implementation.

The method for checking and/or calibrating a horizontal axis of a rotating laser which is carried out using a laser receiver and a controller device, which is communicatively connected to the rotating laser and the laser receiver, has, according to the invention, the following steps:

- the rotating laser is oriented in the horizontal position and the laser receiver is oriented in the longitudinal arrangement,
- the rotating laser is arranged in a first angular position, wherein the horizontal axis in the first angular position is oriented substantially perpendicularly to a detection field of the laser receiver,
  - the rotating laser is inclined by a first inclination angle, wherein at least two different angle values are set for the first inclination angle,
  - for each angle value that is set for the first inclination angle, the position of incidence of the inclined laser beam on the detection field is determined by the laser receiver as a first control point and the distance of the first control point from a zero position of the detection field is stored as a first distance,
- the rotating laser is arranged in a second angular position, wherein the second angular position is rotated relative to the first angular position through 180° about the axis of rotation,
  - the rotating laser is inclined by a second inclination angle, wherein at least two different angle values are set for the second inclination angle,
  - for each angle value that is set for the second inclination angle, the position of incidence of the inclined laser beam on the detection field is determined by the laser receiver as a second control point and the distance of the second control point from the zero position of the detection field is stored as a second distance,
- a first fitting function, which depicts the relationship between the first inclination angle of the rotating laser and the first distance in the first angular position, and a second fitting function, which depicts the relationship between the second inclination angle of the rotating laser and the second distance in the second angular position, are determined,
- an inclination angle is ascertained using the first fitting function and the second fitting function, wherein the inclination angle is used for checking and/or calibrating the horizontal axis.

The method according to the invention for checking and/or calibrating a horizontal axis of a rotating laser is carried out by way of a laser receiver in a horizontal position of the rotating laser and in a longitudinal arrangement of the laser receiver. The orientation of the rotating laser in which the two horizontal axes of the rotating laser are oriented perpendicularly to the vertical direction is defined as the horizontal position of the rotating laser. The orientation of the laser receiver in which the longitudinal direction of the detection field is oriented parallel to the vertical direction is defined as the longitudinal arrangement.

For checking and/or calibrating a horizontal axis, the rotating laser is arranged successively in a first angular position and a second angular position, which differ from one another by 180°. In the first angular position, the rotating laser is inclined by a first inclination angle a using a leveling device and/or an inclination device, wherein at least two different angle values are set for the first inclination angle a. For each angle value of the first inclination angle, the position of incidence of the inclined laser beam on the detection field is determined as a first control point and the distance of the first control point from the zero position of the detection field is stored as a first distance. In the second angular position, the rotating laser is inclined by a second inclination angle b using the leveling device and/or the inclination device, wherein at least two different angle values are set for the second inclination angle b. For each angle value of the second inclination angle, the position of incidence of the inclined laser beam on the detection field is determined as a second control point and the distance of the second control point from the zero position of the detection field is stored as a second distance.

The measurement values are evaluated graphically or analytically. The controller device ascertains a first fitting function, which is in particular in the form of a first straight line, from the first inclination angle a and the associated first distances, and a second fitting function, which is in particular in the form of a second straight line, from the second inclination angle b and the associated second distances. The point of intersection of the first straight line and the second straight line defines the horizontal state of the examined horizontal axis of the rotating laser. In the horizontal state of the horizontal axis, the distance from the zero position in the first angular position and the distance from the zero position in the second angular position are identical.

The method according to the invention for checking and/or calibrating a horizontal axis has the advantage that the method can be carried out at any desired distances and the distance does not need to be measured. The rotating laser and the laser receiver can be arranged at a suitable distance, while care must be taken that the distance in the first angular position and the distance in the second angular position match. In addition, the method is suitable for automated implementation if the rotating laser is arranged on a motorized rotating platform and is moved by way of a motor from the first angular position into the second angular position. In the case of a semi-automatic implementation, the operator manually performs the arrangement of the rotating laser into the first angular position and second angular position upon request, and all other method steps are performed by the rotating laser and the laser receiver.

In a preferred development of the method, an inclination angle u is ascertained by way of the first fitting function and the second fitting function, which angle in the first angular position produces a first difference from the zero position of the detection field and in the second angular position produces a second difference from the zero position of the detection field, with the first difference and the second difference matching. Using the first difference of the first fitting function and the second difference of the second fitting function with respect to the zero position of the detection field, it is possible to determine the inclination angle at which the examined horizontal axis is in the horizontal state.

The inclination angle u is preferably compared to a stored zero position for the horizontal axis. A zero position is stored for each of the two horizontal axes of the rotating laser in the controller device of the rotating laser. In the case of rotating lasers that are used over a wide temperature range, a plurality of temperature-dependent zero positions can be stored for the horizontal axes. In order to set the suitable zero position, the temperature is measured and the corresponding temperature-dependent zero position is selected.

With particular preference, a deviation between the inclination angle u and the stored zero position is determined, and the deviation is compared to a specified maximum deviation. The inclination angle u, which has been determined using the method according to the invention, is compared to the stored zero position for the examined horizontal axis. To this end, the deviation between the inclination angle u and the stored zero position is determined, and the deviation is compared to the specified maximum deviation.

With particular preference, the inclination angle u is stored as a new zero position for the horizontal axis if the deviation is greater than the specified maximum deviation. In the case that the deviation between the inclination angle u and the stored zero position is greater than the specified maximum deviation, the inclination angle u, which has been determined using the method according to the invention, is stored as the new zero position for the examined horizontal axis.

With particular preference, the horizontal axis is checked in a further test loop, wherein the horizontal state of the horizontal axis is defined by the new zero position. It is possible by way of the further test loop to ensure that the inclination angle u, which has been determined using the method according to the invention, indicates the horizontal state of the horizontal axis examined.

Exemplary embodiments of the invention are described hereinafter with reference to the drawings. It is not necessarily intended for these to illustrate the exemplary embodiments to scale; instead, the drawings, where conducive to elucidation, are executed in schematic and/or slightly distorted form. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given design ranges, values within the limits mentioned shall also be disclosed as limiting values and shall be usable and claimable as desired. For the sake of simplicity, identical reference numerals are used hereinafter for identical or similar parts or parts having identical or similar function.

DETAILED DESCRIPTION OF THE DRAWINGS

Figure 1:
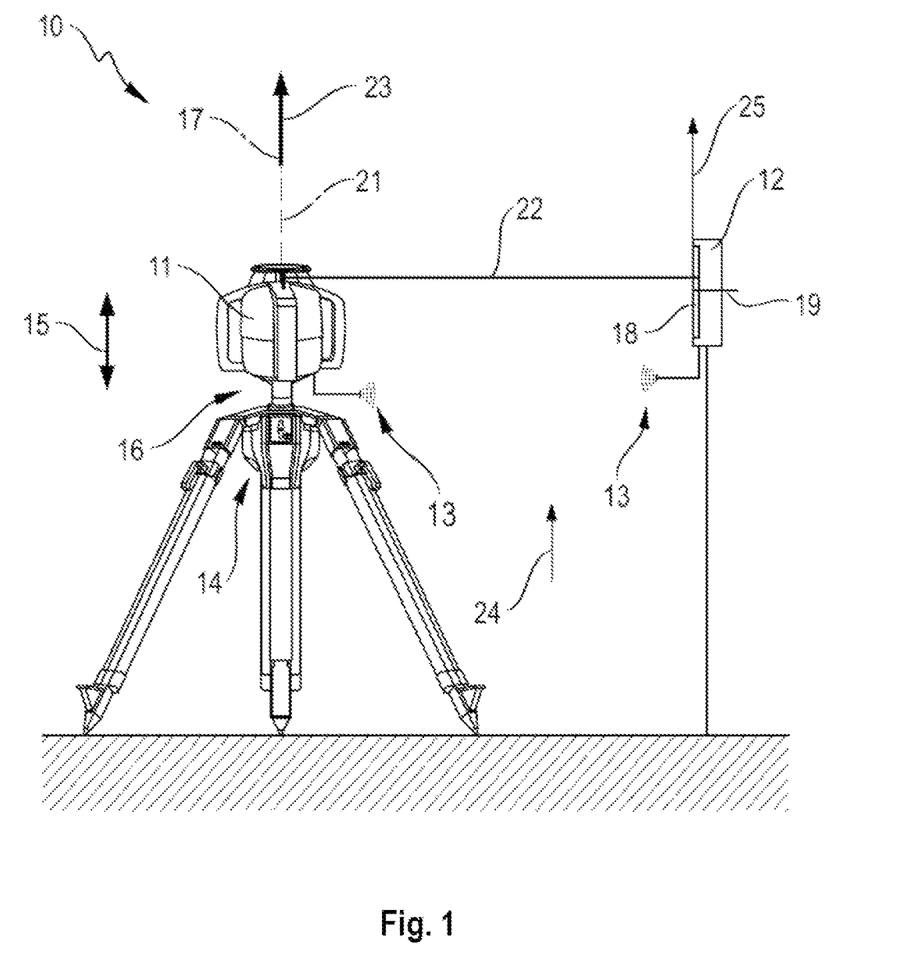
FIG. 1 shows a device having a rotating laser in a horizontal position and a laser receiver in a longitudinal arrangement.

FIG. 1 shows a device 10 having a rotating laser 11 and a laser receiver 12, which are connectable via a wireless communication connection 13. The rotating laser 11 is arranged in a horizontal position, which is appropriate for horizontal applications of the rotating laser. The rotating laser 11 is arranged on a tripod 14, which allows a height setting of the rotating laser 11 in a height direction 15. Additionally, a rotating device embodied in the form of a rotating platform 16, which allows angle adjustment of the rotating laser 11 about an axis of rotation 17 of the rotating platform 16, may be provided. The rotating platform 16 can be integrated in the tripod 14 or in the rotating laser 11 or be embodied in the form of a separate component that is arranged on the tripod 14. The laser receiver 12 is provided with a measurement function, which ascertains a position of incidence of a laser beam on the detection field 18 of the laser receiver 12 and represents the distance of the laser beam from a zero position 19 of the detection field 18.

The rotating laser 11 is embodied as a horizontally and vertically usable rotating laser, which has a first laser beam 22, rotating about an axis of rotation 21 of the rotating laser 11, and a stationary, second laser beam 23. The rotating first laser beam 22 produces a laser plane, which is oriented perpendicular to the axis of rotation 21, and the second laser beam 23 extends perpendicularly to the laser plane of the first laser beam 22. In the case of the horizontal position of the rotating laser 11 illustrated in FIG. 1, the first laser beam 22 is used and is oriented toward the detection field 18 of the laser receiver 12, wherein the laser receiver 12 is oriented in a longitudinal arrangement.

The orientation of the laser receiver 12 is defined by means of the detection field 18 and a vertical direction 24. The detection field 18 of the laser receiver 12, with which the position of incidence of the first or second laser beam 22, 23 is captured, has a detection height $H_D$ in a longitudinal direction 25 and a detection width $B_D$ in a transverse direction 26. The longitudinal direction 25 corresponds to the measurement direction of the laser receiver 12, and the transverse direction 26 is oriented perpendicularly to the longitudinal direction 25, wherein the longitudinal and transverse directions 25, 26 are parallel to an upper side of the detection field 18. The orientation of the laser receiver 12 in which the longitudinal direction 25 of the detection field 18 is oriented parallel to the vertical direction 24 is referred to as the longitudinal arrangement, and the orientation of the laser receiver 12 in which the transverse direction 26 of the detection field 18 is oriented parallel to the vertical direction 24 is referred to as the transverse arrangement.

Figure 2A:
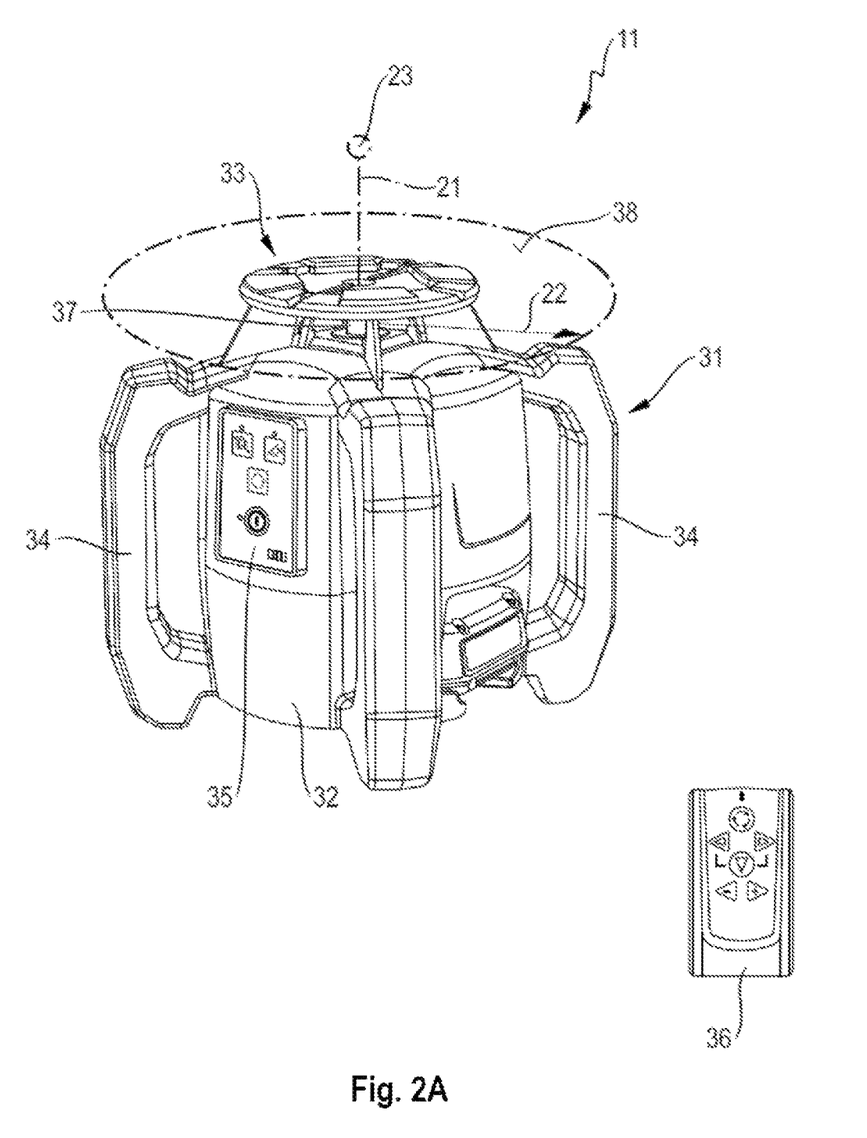
FIGS. 2A-C show the rotating laser of FIG. 1 in a three-dimensional illustration (FIG. 2A) and the essential components of the rotating laser in a schematic illustration in a vertical plane (FIG. 2B) and a horizontal plane (FIG. 2C)
Figure 2B:
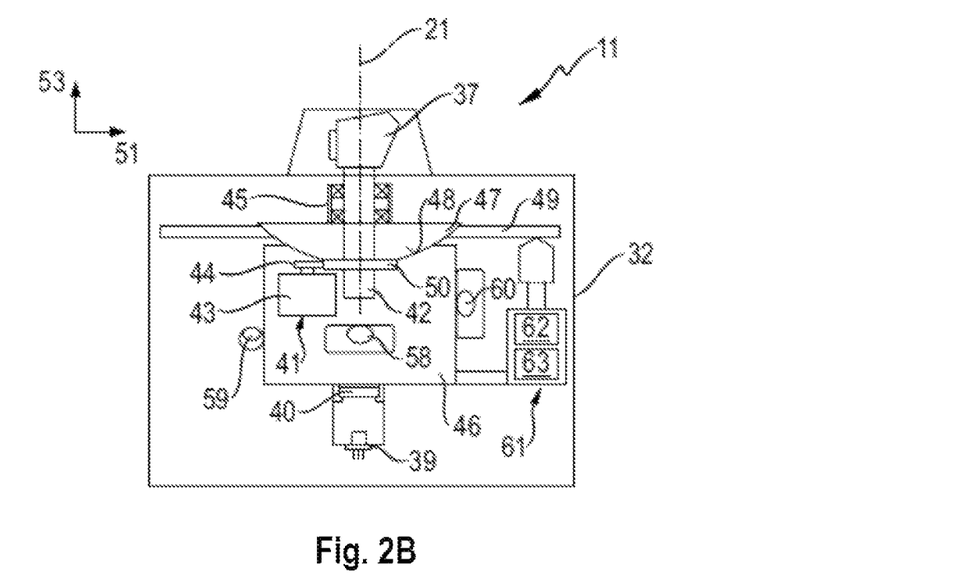
Figure 2C:
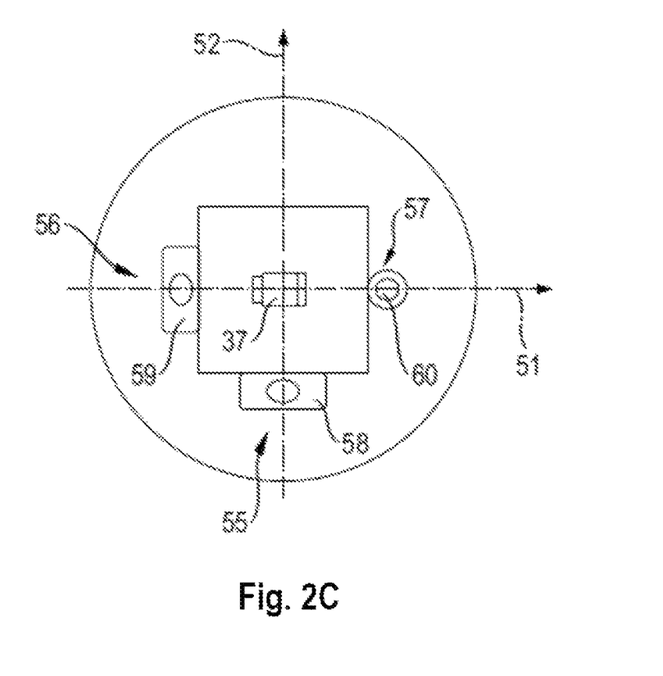

FIGS. 2A-C show the rotating laser 11 in a three-dimensional illustration (FIG. 2A) and the essential components of the rotating laser 11 in a schematic illustration, wherein FIG. 2B illustrates the components in a vertical plane parallel to the axis of rotation 21 and FIG. 2C illustrates the components in a horizontal plane perpendicular to the axis of rotation 21.

The rotating laser 11 comprises a device housing 31 and a measurement device arranged in the device housing 31. The device housing 31 consists of a main housing 32, a rotation head 33, and a plurality of handles 34. The rotating laser 11 is operated via an operating device 35, which is integrated in the main housing 32 and is operable from the outside. In addition to the operating device 35, which is integrated in the main housing 32, a remote control 36, which is connectable to the rotating laser 11 via a communication connection, can be provided. The measurement device of the rotating laser 11 generates a laser beam in the interior of the main housing 32, which laser beam is incident on a deflecting optical unit 37, which rotates about the axis of rotation 21. A first portion of the laser beam is deflected through 90° by the deflecting optical unit 37 and forms the first laser beam 22 of the rotating laser 11, which defines a laser plane 38. A second portion of the laser beam passes through the deflecting optical unit 37 and forms the second laser beam 23 of the rotating laser 11. A distinction is made between a rotation mode, a line mode, and a point mode of the rotating laser 11, depending on the rotation speed with which the first laser beam 22 is rotated about the axis of rotation 21.

FIGS. 2B, 2C show the essential components of the rotating laser 11 in a schematic illustration. The rotating laser 11 comprises a laser device having a beam source 39, which generates a laser beam, and a collimation optical unit 40. The beam source 39 is for example embodied as a semiconductor laser that generates the laser beam in the visible wavelength spectrum, for example a red laser beam having a wavelength of 635 nm or a green laser beam having a wavelength of 532 nm. After the laser beam exits the beam source 39, the laser beam is collimated by means of the collimation optical unit 40. Alternatively, the collimation optical unit can be integrated in the beam source, or the collimation optical unit can be omitted in the case of a beam source 39 having a high beam quality and low divergence.

The collimated laser beam is incident on the deflecting optical unit 37, which splits the first and the second laser beam 22, 23. The deflecting optical unit 37 is connected to a rotation device 41, which moves the deflecting optical unit 37 about the axis of rotation 21. The rotation device 41 comprises a rotatable shaft 42, a motor unit 43, and a transmission device 44, which is embodied for example in the form of a toothed belt and transmits the motion of the motor unit 43 to the shaft 42. The deflecting optical unit 37 is coupled to the rotatable shaft 42 and is embodied such that it is rotatable about the axis of rotation 21. The shaft 42 is mounted in a pivot bearing 45 of a stator part 46, which is connected to a spherical calotte 47. The spherical calotte 47 is mounted in a spherical calotte bearing 48 in a mounting frame 49, which is fixed with respect to the housing, such that it is able to be inclined about two pivot planes that are perpendicular to the rotation plane (plane perpendicular to the axis of rotation 21). The rotating laser 11 comprises a measurement device 50, which measures the rotation angle of the shaft 42 during the rotation about the axis of rotation 21. The measurement device 50 is embodied for example as an angle encoder and consists of a scale disk, which is connected to the shaft 42 so as to rotate therewith, a scanning device, with which the scale disk is scanned, and an evaluation and control element.

The rotating laser 11 is embodied as a horizontally and vertically usable rotating laser, wherein a horizontally and vertically usable rotating laser differs from a horizontally usable rotating laser by way of an additional device axis. The rotating laser 11 has, as the device axis, a first horizontal axis 51 and a second horizontal axis 52, which are perpendicular with respect to one another and define a horizontal plane. The first and second horizontal axes 51, 52 are displayed on the rotation head 33 of the rotating laser 11 by way of display elements. The horizontally and vertically usable rotating laser 11 has, in addition to the first and second horizontal axes 51, 52, a further device axis, which is referred to as the vertical axis 53 and is oriented in the ideal case perpendicularly to the device plane of the first and second horizontal axes 51, 52.

The rotating laser 11 is in the form of a self-leveling rotating laser, which automatically assumes a level position if the device housing 31 of the rotating laser 11 is placed within a self-leveling range. The self-leveling range of rotating lasers typically lies at 5°. The rotating laser 11 comprises a leveling device 54, which orients the device axes of the rotating laser 11 into a defined state independently of an orientation of the device housing 31. The leveling device 54 comprises a first leveling unit 55, which orients the first horizontal axis 51 into a first defined state, a second leveling unit 56, which orients the second horizontal axis 52 into a second defined state, and a third leveling unit 57, which orients the vertical axis 53 into a third defined state. In the case of a rotating laser which is usable only horizontally, the third leveling unit 57 is dispensed with.

The first leveling unit 55 comprises a first inclination sensor 58 and a first adjustment element, the second leveling unit 56 comprises a second inclination sensor 59 and a second adjustment element, and the third leveling unit 57 comprises a third inclination sensor 60 and a third adjustment element. The adjustment elements of the leveling units 55, 56, 57 are integrated into an inclination device 61 having a first servomotor 62 and a second servomotor 63. The first servomotor 62 inclines the mounting frame 49 about a first pivot axis, which coincides with the second horizontal axis 52, and the second servomotor 63 inclines the mounting frame 49 about a second pivot axis, which coincides with the first horizontal axis 51. The first servomotor 62 forms the first adjustment element of the first leveling unit 55, and the second servomotor 63 forms the second adjustment element of the second leveling unit 56. Since the vertical axis 53 is oriented perpendicularly to the horizontal plane of the first and second horizontal axes 51, 52, the orientation of the vertical axis 53 can be set by way of the first and second servomotors 62, 63. The first and second servomotors 62, 63 together form the third adjustment element of the third leveling unit 57.

The horizontal orientation of the laser plane or of the device plane represents a preferred defined state into which a rotating laser 11 in the horizontal position should be oriented, wherein the horizontally oriented device plane is also referred to as the horizontal plane. The vertical orientation of the laser plane or of the device plane represents a preferred defined state into which a rotating laser 11 in the vertical position should be oriented, wherein the vertically oriented device plane is also referred to as the vertical plane. The laser plane 38 produced by the rotating first laser beam 22 can be inclined relative to the horizontal plane or the vertical plane of the rotating laser 11 by way of the inclination device 61. The rotating laser 11 can incline the laser plane of the rotating first laser beam 22 in one inclination direction or in two inclination directions. The inclination of the laser plane is effected in the leveled state of the rotating laser 11. The rotating laser 11 can be inclined in the horizontal position or the vertical position.

Figure 3A:
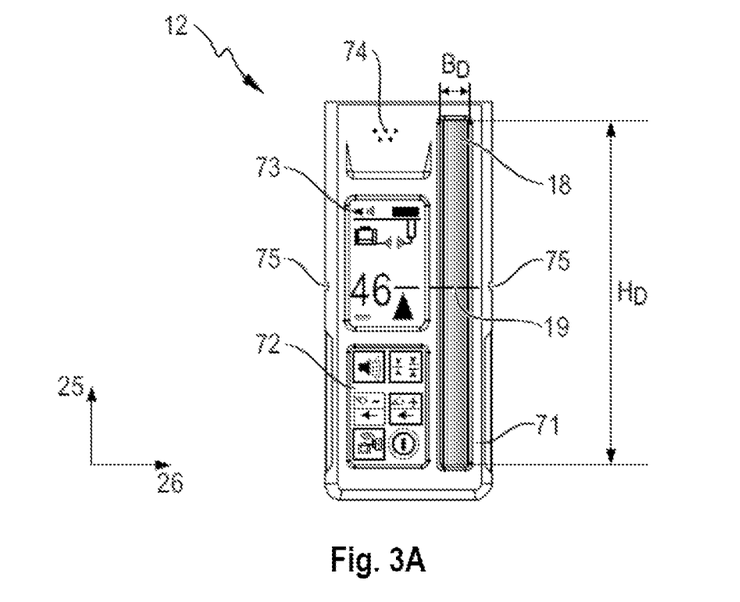
FIGS. 3A, 3B show the laser receiver of FIG. 1 in a three-dimensional illustration (FIG. 3A) and the essential components of the laser receiver and of the rotating laser in a schematic illustration (FIG. 3B)
Figure 3B:
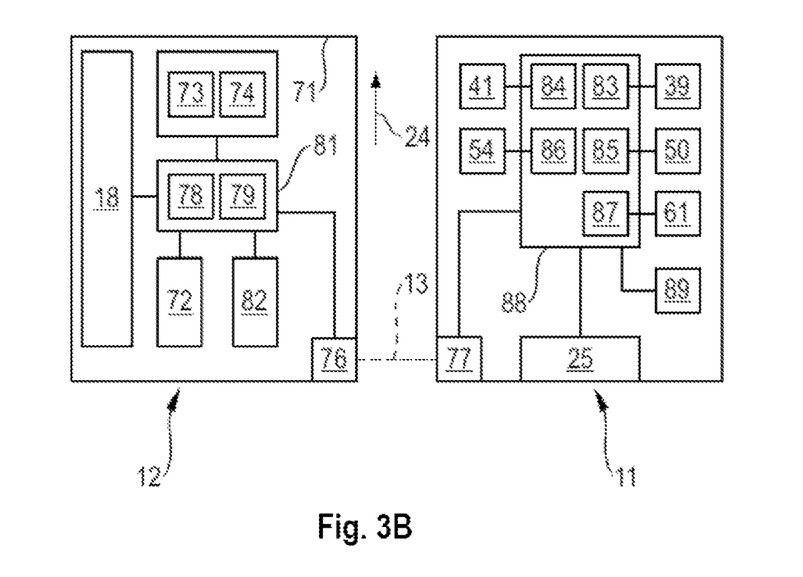

FIGS. 3A, 3B show the laser receiver 12 in a three-dimensional illustration (FIG. 3A) and the essential components of the laser receiver 12 and also the interaction with the rotating laser 11 in a schematic illustration (FIG. 3B). The laser receiver 12 is provided with a measurement function, which determines the distance of a laser beam from the zero position 19 of the detection field 18.

The laser receiver 12 comprises a receiver housing 71, an operating device 72, an optical display 73, a loudspeaker 74, and the detection field 18, with which the position of incidence of the laser beam is captured. In the longitudinal direction 25, the detection field 18 has the detection height $H_D$ and in the transverse direction 26 it has the detection width $B_D$. The longitudinal direction 25 corresponds to the measurement direction of the laser receiver 12, and the transverse direction 26 is oriented perpendicularly to the longitudinal direction 25, wherein the longitudinal and transverse directions 25, 26 are parallel to the detection field 18.

The operating device 72, the optical display 73, the loudspeaker 74, and the detection field 18 are integrated in the receiver housing 71 of the laser receiver 12. The operator can read information relating to the laser receiver 12 via the optical display 73. This includes for example a state of charge of the laser receiver 12, information relating to the wireless communication connection 13 to a rotating laser 11, and the volume setting of the loudspeaker 74. In addition, the distance of a laser beam from the zero position 19 of the laser receiver 12 can be visually displayed as a numerical value. Alternatively or in addition to the optical display on the optical display 73, the distance of the laser beam can be communicated by way of the loudspeaker 74. The zero position 19 of the detection field 18 can be indicated on the receiver housing 71 by way of marking notches 75.

FIG. 3B shows the essential components of the laser receiver 12 and the interaction of the laser receiver 12 with the rotating laser 11 in the form of a block diagram. The communication between the laser receiver 12 and the rotating means 11 takes place via the communication connection 13, which connects a first transmitter/receiver unit 76 in the laser receiver 12 to a second transmitter/receiver unit 77 in the rotating laser 11. The first and second transmitter/receiver units 76, 77 are embodied for example in the form of radio modules, and the communication between the laser receiver 12 and the rotating laser 11 takes place via a communication connection 13 in the form of a radio link.

The detection field 18, the optical display 73, and the loudspeaker 74 are connected to an evaluation device 78, which is arranged in the interior of the receiver housing 71. The evaluation device 78 is connected to a control device 79 for controlling the laser receiver 12, wherein the evaluation device 78 and the control device 79 are integrated in a controller device 81 which is embodied for example in the form of a microcontroller. The laser receiver 12 additionally comprises a sensor module 82, which is arranged in the interior of the receiver housing 71 and is connected to the controller device 81. An inclination of the laser receiver 12 relative to the vertical direction 24 can be measured with the aid of the sensor module 82. The sensor module 82 comprises a 2-axis acceleration sensor or two 1-axis acceleration sensors.

The components of the rotating laser 11 which are controlled via control elements or are connected to an evaluation element include the beam source 39, the rotation device 41, the measurement device 50, and the leveling device 54, and, if present, the inclination device 61. A first control element 83 for controlling the beam source 39, a second control element 84 for controlling the rotation device 41, an evaluation and control element 85 for the measurement device 50, a third control element 86 for controlling the leveling device 54, and a fourth control element 87 for controlling the inclination device 61 can be embodied as separate components or, as illustrated in FIG. 3B, be integrated in a common controller device 88, which is embodied for example in the form of a microcontroller. The control elements 83, 84, 86, 87 and the evaluation and control element 85 are connected to the components of the rotating laser 11 that are to be controlled via communication connections. To differentiate the controller device 81 of the laser receiver 12 and the controller device 88 of the rotating laser 11, the controller device 88 of the rotating laser 11 will be referred to below as the first controller device 88, and the controller device 81 of the laser receiver 12 will be referred to below as the second controller device.

The rotating lasers 11 can additionally comprise a temperature sensor 89, which is arranged in the device housing 31 of the rotating laser 11. The temperature sensor 89 can measure the temperature in the device housing 31 and transmit the temperature to the controller device 88 of the rotating laser 11. Since the orientation of the inclination sensors 58, 59, which orient the first and second horizontal axes 51, 52 of the rotating laser 11 into the horizontal state, is temperature-dependent and the rotating laser 11 can be used in a large temperature range, for example between −20° C. and +50° C., it is advantageous if a plurality of zero positions v are stored in the controller device 88 of the rotating laser 11. For this purpose, a plurality of first zero positions $v_1$ for the first inclination sensor 58 and a plurality of second zero positions $v_2$ for the second inclination sensor 59 in dependence on the temperature can be recorded and stored in a characteristic or table. The zero position associated with the measured temperature is read from the characteristic or the table, and the horizontal axis is oriented into the horizontal state defined by the zero position.

Figure 4A:
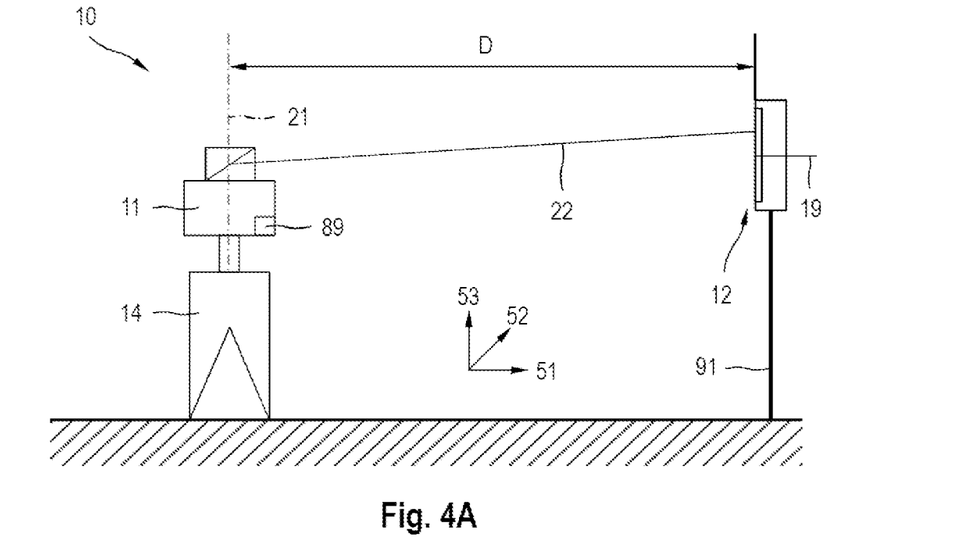
FIGS. 4A, 4B show the rotating laser and the laser receiver of FIG. 1 during the implementation of the method according to the invention for checking and calibrating a horizontal axis of the rotating laser in a first angular position (FIG. 4A) and a second angular position (FIG. 4B)
Figure 4B:
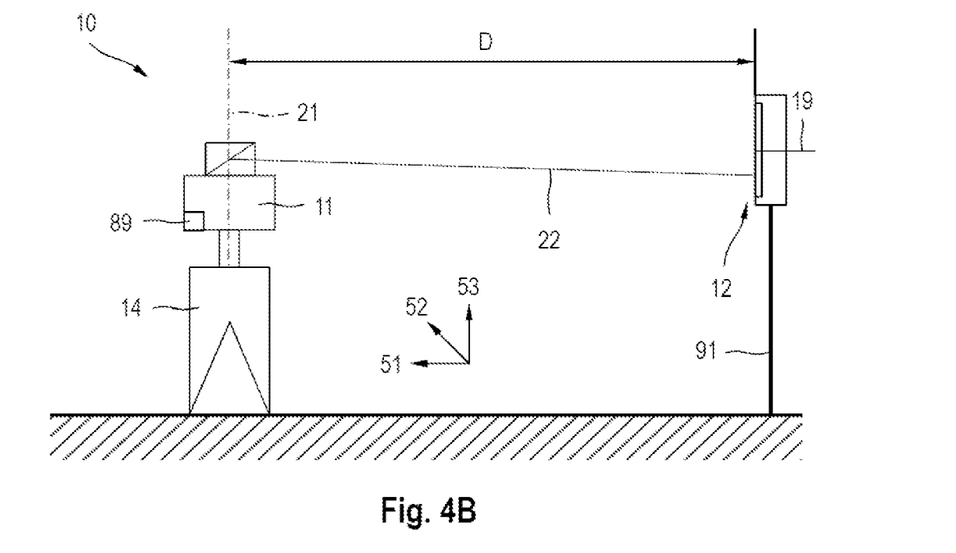

FIGS. 4A, 4B show the device 10 of FIG. 1 with the rotating laser 11 and the laser receiver 12 in the embodiment of the method according to the invention for checking and/or calibrating a horizontal axis 51, 52 of the rotating laser 11, wherein the method is presented on the basis of the first horizontal axis 51. FIG. 4A shows the rotating laser 11 in a first angular position, in which the first horizontal axis 51 to be checked is oriented towards the laser receiver 12, and FIG. 4B shows the rotating laser 11 in a second angular position, which is rotated through 180° about the axis of rotation 17 with respect to the first angular position.

The method according to the invention for checking and/or calibrating a horizontal axis is carried out in a horizontal position of the rotating laser 11 and in a longitudinal arrangement of the laser receiver 12. The rotating laser 11 is placed in the horizontal position on the tripod 14 or on a stable base at a measurement distance D from the laser receiver 12, wherein the measurement distance D is measured between the center of the deflecting optical unit 37 of the rotating laser 11 and the upper side of the detection field 18 of the laser receiver 12. The use of the tripod 14 has the advantage that the method according to the invention is performed at a height in which temperature fluctuations are less pronounced than on the ground. The laser receiver 12 can be attached to a fixed wall, a mobile wall, or a measurement stick. In the exemplary embodiment, the laser receiver 12 is attached to a measurement stick 91.

To set the horizontal position of the rotating laser 11, the first horizontal axis 51 and the second horizontal axis 52 are oriented into a horizontal state, wherein the horizontal state of the first horizontal axis 51 is defined by the first zero position $v_1$ of the first inclination sensor 58 and the horizontal state of the second horizontal axis 52 is defined by the second zero position $v_2$ of the second inclination sensor 59. The first horizontal axis 51 is oriented into the first zero position $v_1$ by way of the first leveling unit 55, and the second horizontal axis 52 is oriented into the second zero position $v_2$ by way of the second leveling unit 59. The first zero position $v_1$ for the first inclination sensor 58 and the second zero position $v_2$ for the second inclination sensor 59 are stored in the first controller device 88 of the rotating laser 11.

Figure 5A:
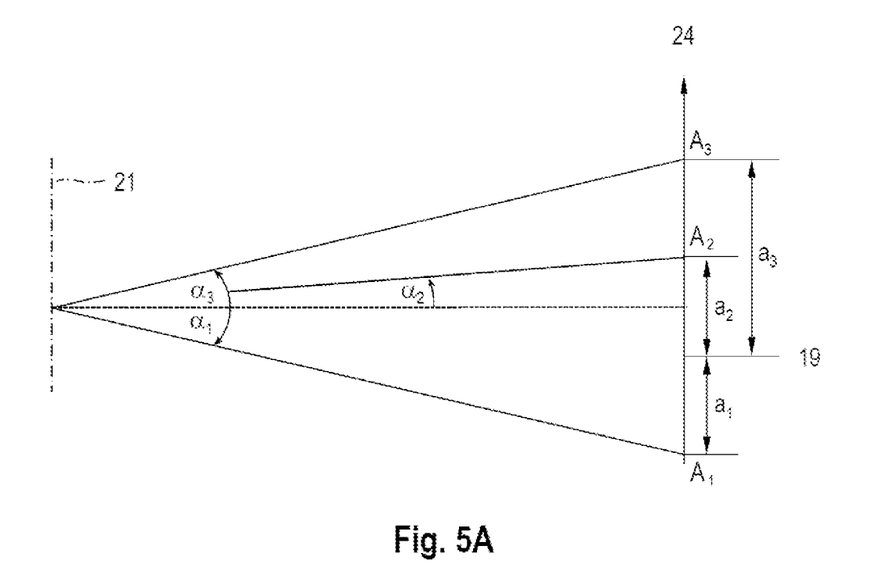
FIGS. 5A, 5B show the positions of incidence of the laser beam on the laser receiver in dependence on an inclination angle of the rotating laser in the first angular position (FIG. 5A) and the second angular position (FIG. 5B)
Figure 5B:
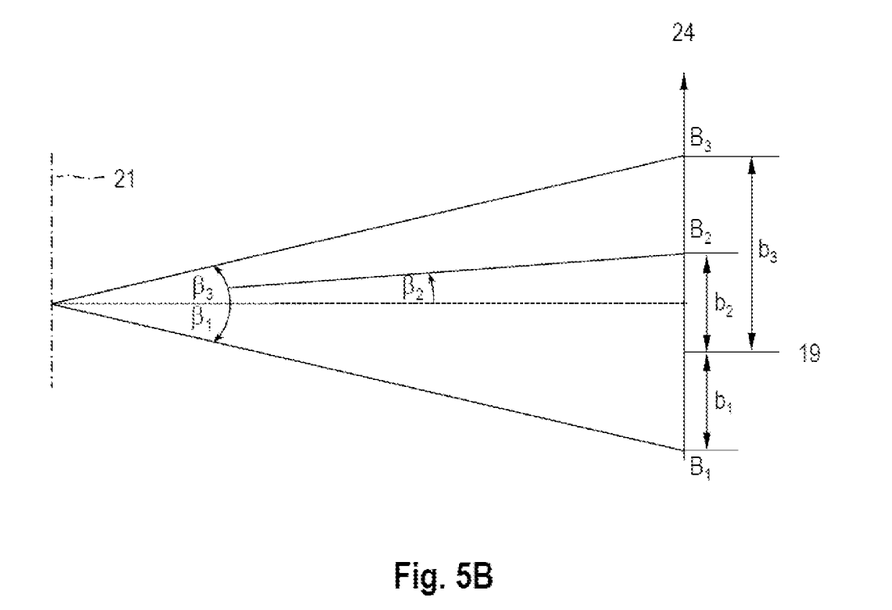

For checking the first horizontal axis 51, the rotating laser 11 is arranged successively in the first angular position and the second angular position, which differ from one another by 180°, wherein the rotating laser 11 can be oriented into the first angular position and the second angular position by way of the rotating device 16 or manually by the operator. The rotating laser 11 is inclined in the first and second angular positions by an inclination angle using the leveling device 54 and/or the inclination device 61, wherein different angle values are set for the inclination angle. For each angle value, the position of incidence of the laser beam on the detection field 18 is determined and the distance from the zero position 19 of the detection field 18 is stored. FIGS. 5A, 5B show the positions of incidence of the laser beam on the detection field 18 in dependence on the inclination angle in the first angular position (FIG. 5A) and in the second angular position (FIG. 5B).

The rotating laser 11 is arranged in the first angular position, in which the rotating laser 11 is inclined by a first inclination angle a. The inclination device 54 sets a first angle value $\alpha_1$ for the first inclination angle $\alpha$, the position of incidence of the laser beam that has been inclined by $\alpha_1$ on the detection field 18 of the laser receiver 12 is determined as the first control point $A_1$, and the distance of the first control point $A_1$ from the zero position 19 of the detection field 18 is stored as the first distance $\alpha_1$. The inclination device 61 sets a second angle value $\alpha_2$ for the first inclination angle $\alpha$, the position of incidence of the laser beam that has been inclined by $\alpha_2$ on the detection field 18 of the laser receiver 12 is determined as a further first control point $A_2$, and the distance of the further first control point $A_2$ from the zero position 19 of the detection field 18 is stored as a further first distance $\alpha_2$. The inclination device 61 sets a third angle value $\alpha_3$ for the first inclination angle $\alpha$, the position of incidence of the laser beam that has been inclined by $\alpha_3$ on the detection field 18 of the laser receiver 12 is determined as a further first control point $A_3$, and the distance of the further first control point $A_3$ from the zero position 19 of the detection field 18 is stored as a further first distance $\alpha_3$.

The rotating laser 11 is oriented by 180° about the axis of rotation 17 from the first angular position into the second angular position (FIG. 4B), in which the first horizontal axis 51 to be checked is oriented in the opposite axial direction onto the detection field 18 of the laser receiver 12. The rotating laser 11 is inclined by a second inclination angle β. The inclination device sets a first angle value $\beta_1$ for the second inclination angle β, the position of incidence of the laser beam that has been inclined by $\beta_1$ on the detection field 18 of the laser receiver 12 is determined as the second control point $B_1$, and the distance of the second control point $B_1$ from the zero position 19 of the detection field 18 is stored as the second distance $b_1$. The inclination device 61 sets a second angle value $\beta_2$ for the second inclination angle β, the position of incidence of the laser beam that has been inclined by $\beta_2$ on the detection field 18 of the laser receiver 12 is determined as a further second control point $B_2$, and the distance of the further second control point $B_2$ from the zero position 19 of the detection field 18 is stored as a further second distance $b_2$. The inclination device 61 sets a third angle value $\beta_3$ for the second inclination angle β, the position of incidence of the laser beam that has been inclined by $\beta_3$ on the detection field 18 of the laser receiver 12 is determined as a further second control point $B_3$, and the distance of the further second control point $B_3$ from the zero position 19 of the detection field 18 is stored as a further second distance $b_3$.

In the exemplary embodiment of FIGS. 5A, 5B, three angle values $a_1$, $a_2$, $a_3$ are set for the first inclination angle a and three angle values $b_1$, $b_2$, $b_3$ are set for the second inclination angle b. For carrying out the method according to the invention, at least two different angle values are required for the first inclination angle a and two angle values for the second inclination angle b. The more angle values are set for the first inclination angle a and the second inclination angle b, the greater the precision with which the first fitting function and the second fitting function can be determined.

The evaluation can be performed as described by the evaluation device 78 of the laser receiver 12. Alternatively, the evaluation can be performed by a corresponding component in the rotating laser 11 or by a further component. If the evaluation is not performed by the evaluation device 78 of the laser receiver 12, the first distances $a_1$, $a_2$, $a_3$ and the second distances $b_1$, $b_2$, $b_3$ are transmitted to the corresponding component via a communication connection.

Figure 6:
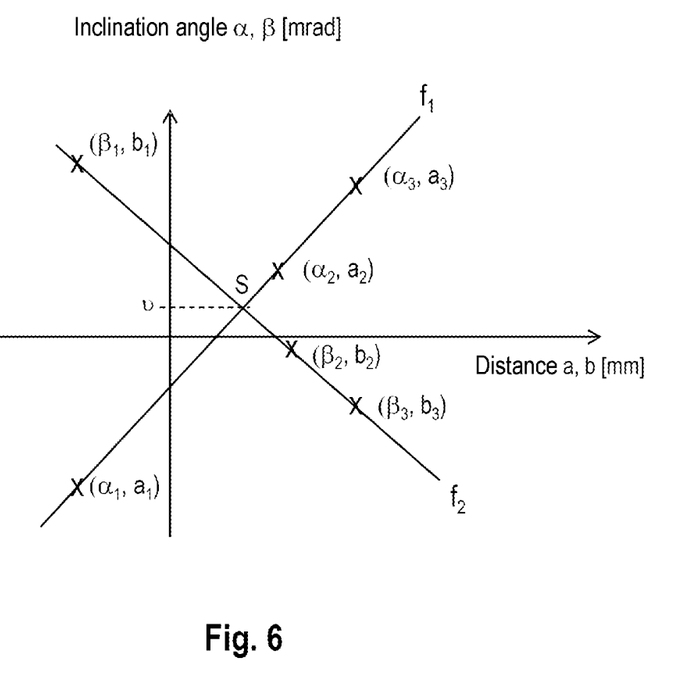
FIG. 6 shows the evaluation of the measurement values that have been recorded in the first angular position and the second angular position.

FIG. 6 shows the evaluation of the measurement values that have been recorded in the first angular position and the second angular position. Plotted on the x-axis is an inclination angle, with the term "inclination angle" summarizing the first inclination angle a in the first angular position and the second inclination angle b in the second angular position. Plotted on the y-axis is a distance, with the term "distance" summarizing the first distance a in the first angular position and the second distance b in the second angular position.

The first controller device 88 of the rotating laser, the second controller device 81 of the laser receiver, or a further controller device determines a first fitting function $f_1$, which depicts the relationship between the first inclination angle a and the first distance a, and a second fitting function $f_2$, which depicts the relationship between the second inclination angle b and the second distance b. In the exemplary embodiment, the first fitting function $f_1$ is a first straight line and the second fitting function $f_2$ is a second straight line.

The first straight line $f_1$ and the second straight line $f_2$ intersect at a point of intersection S, which indicates the horizontal state of the examined horizontal axis of the rotating laser. The point of intersection S determines an inclination angle u for which a correspondingly inclined laser beam has the same distance from the zero position 19 of the detection field 18 of the laser receiver 12 in the first angular position and the second angular position. If the laser beam has the same distance from the zero position 19 upon rotation of the rotating laser 11 about 180°, the horizontal state of the examined horizontal axis has been found.

A zero position is stored in the controller device 88 of the rotating laser 11 for each of the two horizontal axes 51, 52 of the rotating laser 11, a first zero position $v_1$ is stored for the first horizontal axis 51 and a second zero position $v_2$ is stored for the second horizontal axis 52. In the case of rotating lasers that are used over a wide temperature range, a plurality of temperature-dependent zero positions can be stored for the horizontal axes 51, 52.

In a first variant, the inclination angle u, which was determined using the method according to the invention, can be defined as the zero position for the examined horizontal axis 51, 52. In an alternative, second variant, the inclination angle u, which was determined using the method according to the invention, can be used to determine the deviation of the examined horizontal axis 51, 52. The inclination angle u is compared to the stored zero position for the examined horizontal axis. To this end, the deviation between the inclination angle u and the stored zero position is determined and compared to a specified maximum deviation. In the case that the deviation between the inclination angle u and the stored zero position is greater than the specified maximum deviation, the inclination angle u, which has been determined using the method according to the invention, is stored as the new zero position for the examined horizontal axis.

The invention claimed is:

1. A method for checking and/or calibrating a horizontal axis (51, 52) of a rotating laser (11) using a laser receiver (12) and a controller device (81, 88), which is communicatively connected to the rotating laser (11) and the laser receiver (12), wherein the rotating laser (11) emits a laser beam (22) rotating about an axis of rotation (21) in a laser plane (38), comprising the steps of:
   orienting the rotating laser (11) in a horizontal position and orienting the laser receiver (12) in a longitudinal arrangement;
   arranging the rotating laser (11) in a first angular position, wherein the horizontal axis (51, 52) in the first angular position is oriented substantially perpendicularly to a detection field (18) of the laser receiver (12);
   wherein the rotating laser (11) is inclined by a first inclination angle (a) and wherein at least two different angle values ($a_1, a_2, a_3$) are set for the first inclination angle (a);
   wherein for each angle value ($a_1, a_2, a_3$) that is set for the first inclination angle (a), a position of incidence of an inclined laser beam (22) of the rotating laser (11) on the detection field (18) is determined by the laser receiver (12) as a first control point ($A_1, A_2, A_3$) and a first distance of the first control point ($A_1, A_2, A_3$) from a zero position (19) of the detection field (18) is stored as a first distance ($a_1, a_2, a_3$);
   arranging the rotating laser (11) in a second angular position, wherein the second angular position is rotated relative to the first angular position through 180° about the axis of rotation (21);
   wherein the rotating laser (11) is inclined by a second inclination angle (b) and wherein at least two different angle values ($b_1, b_2, b_3$) are set for the second inclination angle (b);
   wherein for each angle value ($b_1, b_2, b_3$) that is set for the second inclination angle (b), a position of incidence of the inclined laser beam (22) of the rotating laser (11) on the detection field (18) is determined by the laser receiver (12) as a second control point ($B_1, B_2, B_3$) and a second distance of the second control point ($B_1, B_2, B_3$) from the zero position (19) of the detection field (18) is stored as a second distance ($b1, b_2, b_3$);
   determining a first fitting function ($f_1$), which depicts a first relationship between the first inclination angle ($a_1, a_2, a_3$) of the rotating laser (11) and the first distance ($a_1, a_2, a_3$) in the first angular position, and a second fitting function ($f_2$), which depicts a second relationship between the second inclination angle ($b1, b_2, b_3$) of the rotating laser (11) and the second distance ($b_1, b_2, b_3$) in the second angular position; and
   ascertaining an inclination angle (u) using the first fitting function ($f_1$) and the second fitting function ($f_2$), wherein the inclination angle (u) is used for the checking and/or the calibrating of the horizontal axis (51, 52).

2. The method as claimed in claim 1, wherein the inclination angle (u) in the first angular position produces a first difference from the zero position (19) of the detection field (18) and in the second angular position produces a second difference from the zero position (19) of the detection field (18) and wherein the first difference and the second difference match.

3. The method as claimed in claim 1, wherein the inclination angle (u) is compared to a stored zero position ($v_1, v_2$) for the horizontal axis (51, 52).

4. The method as claimed in claim 3 further comprising the step of determining a deviation ($\Delta_1, \Delta_2$) between the inclination angle and the stored zero position ($v_1, v_2$) and comparing the deviation ($\Delta_1, \Delta_2$) to a specified maximum deviation ($\Delta^{max}$).

5. The method as claimed in claim 4, wherein the inclination angle is stored as a new zero position for the horizontal axis (51, 52) if the deviation ($\Delta_1, \Delta_2$) is greater than the specified maximum deviation ($\Delta_{max}$).

6. The method as claimed in claim 5, wherein the horizontal axis (51, 52) is checked in a test loop wherein a horizontal state of the horizontal axis is defined by the new zero position.

* * * * *